No. 657,580.　　　　　　　　　　　　　Patented Sept. 11, 1900.
J. T. WOOLERY.
COTTON PICKING AND CLEANING MACHINE.
(Application filed Jan. 27, 1900.)
(No Model.)
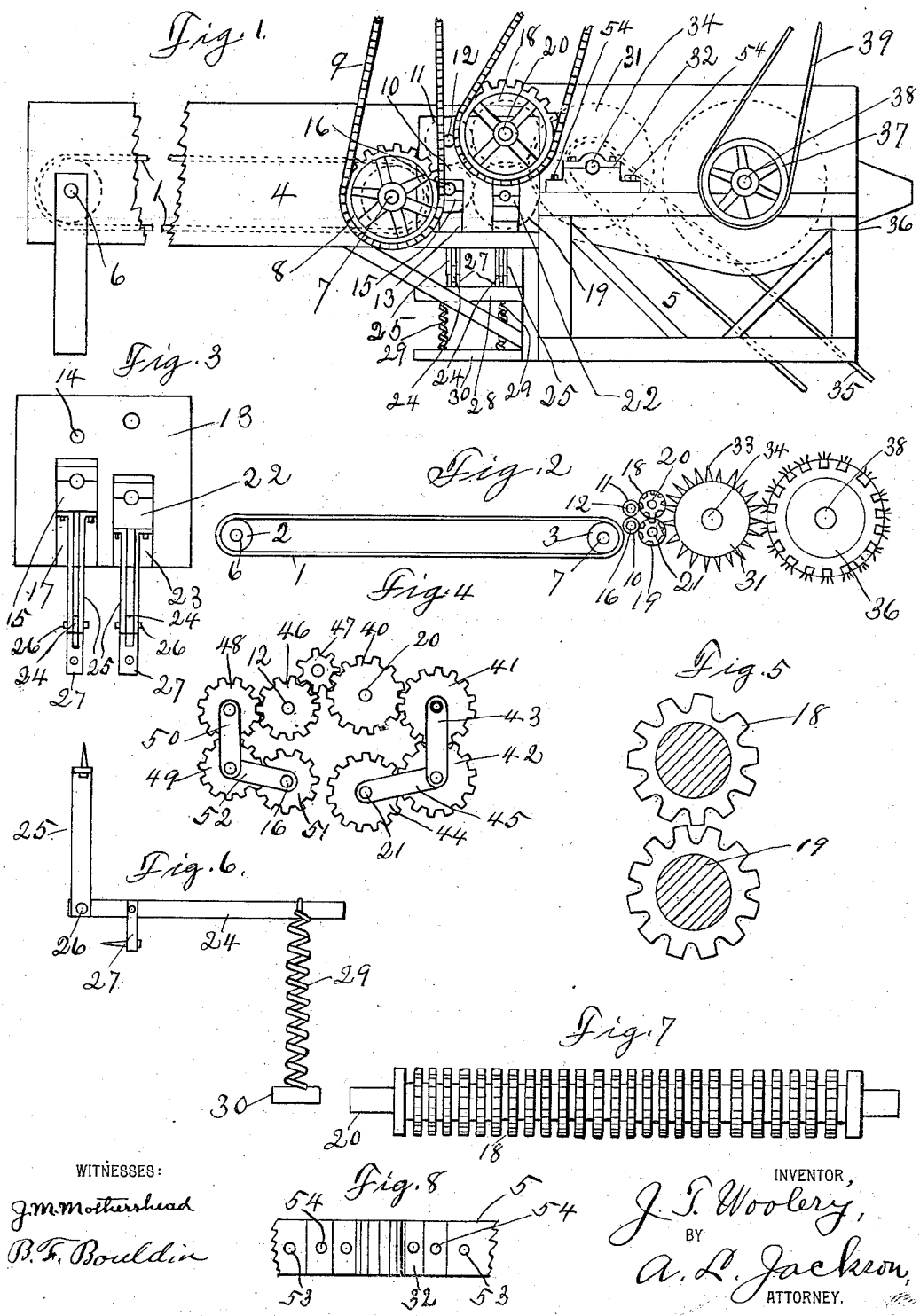
WITNESSES:
J. M. Mothershead
B. F. Bouldin
INVENTOR,
J. T. Woolery,
BY
A. L. Jackson,
ATTORNEY.

UNITED STATES PATENT OFFICE.

JOHN T. WOOLERY, OF FORT WORTH, TEXAS.

COTTON PICKING AND CLEANING MACHINE.

SPECIFICATION forming part of Letters Patent No. 657,580, dated September 11, 1900.

Application filed January 27, 1900. Serial No. 3,003. (No model.)

*To all whom it may concern:*

Be it known that I, JOHN T. WOOLERY, a citizen of the United States, residing at Fort Worth, Texas, have invented a new and Improved Cotton Picking and Cleaning Machine, of which the following is a specification.

This invention relates to machines for picking or disintegrating material that has short and fine fibers, such as cotton; and the object is to construct a machine that will separate the fibers of the material, so that dust and dirt or other matter that will destroy the elasticity of the material can be removed therefrom, and by which the material is prepared for making mattresses, pillows, bolsters, comforts, and cushions. The invention will be hereinafter fully described, and more particularly pointed out in the claims.

Reference is had to the accompanying drawings, which form a part of this application.

Figure 1 is a side elevation of a machine embodying my invention. Fig. 2 is a diagrammatic view of the feed-rollers and the picker and brush. Fig. 3 is a detail view of the movable bearings. Fig. 4 is a diagrammatic view of the driving-gear for the feed-rollers. Fig. 5 is a cross-section of the grooved feed-rollers, illustrating the position which these rollers occupy to each other. Fig. 6 illustrates the spring-pressed lever for supporting the bearings of the movable feed-rollers. Fig. 7 illustrates one of the grooved feed-rollers. Fig. 8 is a detail plan view of the bearing for the picker, showing several holes for adjustment of the picker toward and from the feed-rollers.

Similar characters of reference are used to indicate the same parts throughout the several views.

The invention consists of feed-rollers, means for delivering material to the feed-rollers, a picker, and a brush for taking the material from the picker.

The means for delivering the material to the feed-rollers consists of a traveling apron or belt 1, mounted on drums 2 and 3. These drums are mounted in a suitable frame 4, which is connected to the frame 5. The shafts 6 and 7 project through the sides of the frame, and a drive-wheel 8 is mounted on shaft 7. This is a sprocket-wheel and is driven by a sprocket-chain 9, which extends to a suitable motive power. The belt 1 delivers the material to feed-rollers 10 and 11. Roller 11 is journaled in the sides of the frame 4, and the shaft 12 projects through the bearing-block 13, which is attached to the side of frame 4 and has a bearing 14 therein. Roller 10 is mounted in a spring-pressed bearing 15. Bearing 15 moves in a slot 17 and supports roller 10 by means of the shaft 16. Rollers 10 and 11 deliver the material after it has been somewhat compressed to other feed-rollers 18 and 19. The roller 18 is journaled by means of its shaft 20 in the sides of frame 4 and block 13. Roller 19 is journaled by means of its shaft 21 in the movable or spring-pressed bearing 22. The bearing 22 moves in a slot or way 23 in block 13. The bearings 15 and 22 are supported on spring-pressed levers 24 by means of link rods or standards 25, which are attached to the bearings and to the short arms of the levers by pivot-bolts 26 or in any other suitable way. The levers have fulcrums on suitable supports 27, which may be attached to bars 28 of the frame or to any suitable supports. Spiral springs 29 are attached to the long arms of levers 24 and to the floor of the building or to a sill 30. Springs 29 keep the boxes 15 and 22 constantly pressed upward, and thus the rollers 10 and 11 are held yieldingly in close proximity to each other.

The picker-cylinder 31 is mounted in bearings 32 and is provided with teeth 33. This cylinder can be driven by any suitable motive power, and a drive-wheel may be mounted on the shaft 34 and driven by a band 35.

The brush-cylinder 36 is mounted adjacent to the picker-cylinder and may be driven by a pulley 37, mounted on shaft 38, and this pulley may be driven by a band 39, running to a suitable motive power.

The feed-rollers 10, 11, 18, and 19 are driven by the spur-gearing shown in Fig. 4. It will be seen that power applied to shaft 20, as shown in Fig. 1, will drive all the gear-wheels. Rollers 11 and 18 have stationary bearings, and rollers 10 and 19 are mounted in movable bearings. Shaft 20 drives wheel 40. Wheel 40 drives wheel 41, mounted in stationary bearings. Wheel 41 drives wheel 42, which is mounted in swinging arm 43, which holds the two wheels in mesh. Wheel 42 drives wheel 44, which is mounted on shaft 21 and is held in mesh with said wheel by swinging arm 45. Power is transmitted to wheel 46 from wheel 40 by means of gear-wheel 47. Wheel 46 drives wheel 48, which is mounted in stationary bearings. Wheel 48 drives wheel 49, which is mounted in swinging arm 50. This arm holds wheels 48 and 49 in mesh. Wheel 49 drives wheel 51, which is mounted on shaft 16 of the lower front feed-roller. Swinging arm 52 holds wheels 49 and 51 in mesh. It will be seen that rollers 10 and 19 have yielding motions and that they are or can be driven in all positions that they may occupy by means of the gearing shown and above described.

The surfaces of the rollers 10 and 11 are smooth. These rollers somewhat compress material and prepare it for the rollers 18 and 19. Rollers 18 and 19 have annular grooves and longitudinal grooves therein. These grooves leave enough of the surfaces of the rollers for bearing-surfaces to compress and hold material, so that it will not be drawn from the rollers too fast by the teeth of the picker-cylinder. The teeth of the picker run partly through the annular grooves of both rollers. The rollers are so arranged that a bearing-surface of one roller will always be opposite a longitudinal groove of the other roller, as shown in Fig. 5. The annular grooves in the feed-rollers are about five-sixteenths of an inch deep, and the teeth of the picker run more or less of this depth. If the material to be picked has very short fiber, the teeth project just about to the bottom of the grooves. If the material has long fiber, the teeth need not extend so far in the grooves. In order to adapt the picker-teeth for use on fiber of different lengths, the bearings of the picker-shaft are made adjustable on the frame 5. Additional bolt-holes 53 are provided for bolts 54, so that the bearings may be attached at different adjustments on the frame 5. The longitudinal grooves in rollers 18 and 19 need not be made as deep as the annular grooves, as it is not probable that the material will ever be pressed to the bottom of the grooves. It will be seen that the object of the feed-rollers being so constructed is to feed the material as the rollers are turned and at the same time hold the material so firmly that it will not be drawn through the rollers too fast by the picker. The material must be separated to single fibers in order to get the best effects in cleaning the material and in securing elasticity in the manufactured articles. The longitudinal grooves make recesses in which the material is slightly pressed, so it will not go between the rollers straight, but will be somewhat corrugated and will be held by the edges of the surfaces on the side of the grooves.

Various changes in the assembling of various parts of the machine may be made without departing from this invention.

Having fully described my invention, what I claim as new, and desire to secure by Letters Patent, is—

1. A picking and cleaning machine having feed-rollers arranged in pairs, a suitable frame for said rollers, a picker mounted in said frame adjacent to one pair of said rollers, and a brush mounted in said frame adjacent to said picker, the pair of rollers next to said picker having annular grooves therein oppositely disposed and the teeth of said picker being adapted to run in the grooves of each roller.

2. A picking and cleaning machine having a pair of feed-rollers, a suitable frame for said rollers, a spring-pressed bearing for one of said rollers, a pair of annularly-grooved feed-rollers mounted in said frame adjacent to said first-named rollers, the grooves in the rollers being oppositely disposed a spring-pressed bearing for one of said rollers, a picker mounted in said frame and being provided with teeth adapted to run in the grooves of each of said rollers, and a brush adapted to take material from said picker.

3. A picking and cleaning machine having a pair of feed-rollers, a suitable frame for said rollers, a picker mounted in said frame adjacent to said rollers, a brush for removing material from said picker, stationary bearings for one of said feed-rollers, and movable bearings for the other one of said bearings, said feed-rollers having annular grooves therein and said picker having teeth adapted to run in said grooves and pick material from said rollers.

4. A picking and cleaning machine having a picker, a brush, and feed-rollers adjacent to said picker, stationary bearings for one of said rollers, movable bearings for the other feed-roller, a lever for each of said bearings having a suitable fulcrum, link-bars attached to the short arms of said levers and supporting said bearings, and spiral springs attached to the long arms of said levers and to a fixed support whereby said rollers are held yieldingly in close proximity, said rollers having annular grooves therein and said picker having teeth running in said grooves.

5. A picking and cleaning machine having a suitable frame, a picker, a brush, and two pairs of feed-rollers all mounted in said frame, one roller of each pair of feed-rollers being mounted in spring-pressed bearings, one pair of said feed-rollers having annular and longitudinal grooves therein, said rollers being so arranged that a bearing-surface of one roller is opposite a longitudinal groove in the other roller, said picker having teeth adapted to run in the annular grooves of both of said rollers.

In testimony whereof I set my hand, in the presence of two witnesses, this 20th day of December, 1899.

JOHN T. WOOLERY.

Witnesses:
WM. Z. MANCHESTER,
J. M. MOTHERSHEAD.